INVENTORS
Joseph M. Richards
William R. Rabson
BY
William S. Dorman
ATTORNEY

United States Patent Office

3,563,879
Patented Feb. 16, 1971

3,563,879
ELECTROLYTIC CHLORINE GENERATOR
Joseph M. Richards, 2819 E. 49th St., Tulsa, Okla. 74105, and William R. Rabson, 7 Asbury Place, Houston, Tex. 77007
Filed Mar. 8, 1967, Ser. No. 621,545
Int. Cl. B01k 3/00
U.S. Cl. 204—272                    3 Claims

ABSTRACT OF THE DISCLOSURE

An electrolytic chlorine generator operating on the well known principle of electrolysis of a solution of a metallic chloride salt, builds up its own internal pressure and discharges chlorine into a flowing stream.

---

The present invention relates to an electrolytic chlorine generator for chlorinating a body of water such as a swimming pool.

Generally speaking, bodies of water, such as swimming pools, are chlorinated in two different ways:

First of all, the most common method of chlorinating a swimming pool is by the use of dry hypochlorites or hypochlorite solutions; a second common method of chlorinating swimming pools involves the introduction of gaseous chlorine which is stored as liquid chlorine in containers under high pressure. In either case the owner of the pool has to check the condition of the water almost daily after which the pool water is treated manually.

The present invention involves a chlorine generator which operates on the principle of the electrolysis of a solution of a metallic chloride salt. After the generator has been operating for a certain period of time the pressure of the chlorine generated builds up such that it is capable of discharging gaseous chlorine into the return water line from the circulating pump to the pool. Also, the rate of electrolysis can be controlled such that the discharge of chlorine into the return water line is substantially constant so as to obviate the necessity for checking the pool as frequently as required by the prior art methods.

Therefore it is a principal object of the present invention to provide an electrolytic chlorine generator of the type described herein which is capable of discharging, preferably continuously, gaseous chlorine into the liquid which is to be chlorinated.

It is another object of the present invention to provide a chlorine generator which is relatively simple in design and inexpensive of operation.

Other and further objects and advantageous features of the present invention will hereinafter more fully appear in connection with a detailed description of the drawings in which.

Figure 3:
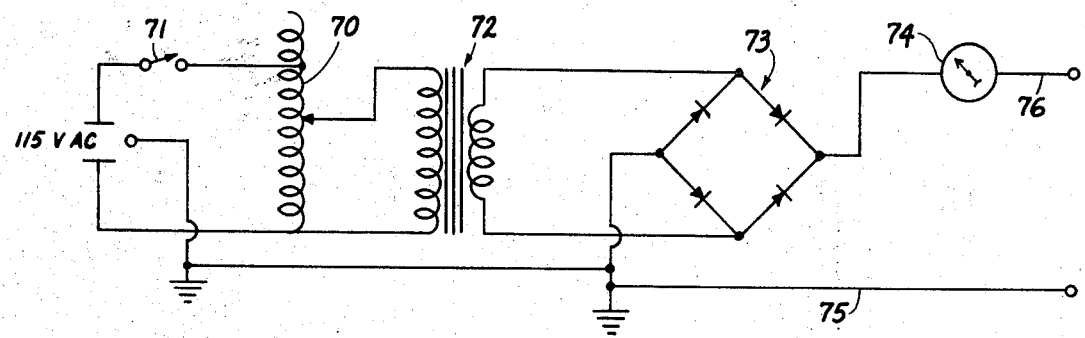
FIG. 3 is an electrical circuit diagram of the power supply used for the chlorinator shown in FIG. 2.

Referring to the drawings in detail, a quantity of water 10 is maintained within a pool 11, the latter being shown in outline form only; obviously the pool would be mainly below floor or ground level. At the bottom of the pool, a drain line 12 communicates with a circulating pump 13. The outlet of the pump connects with a filter 14 by means of the pipe 15. The filter, in turn, connects with the pool 11 by means of the pipe 16. The inlet to the pool is preferably slightly below the upper level of the water 10. A chlorine generator 17 connects with the return line 16 by means of conduits 18 and 19. As will hereinafter more fully appear the conduit 18 injects gaseous chlorine into the return line 16. The conduit 19 introduces gaseous hydrogen together with a quantity of sodium hydroxide into the return line 16.

Figure 2:
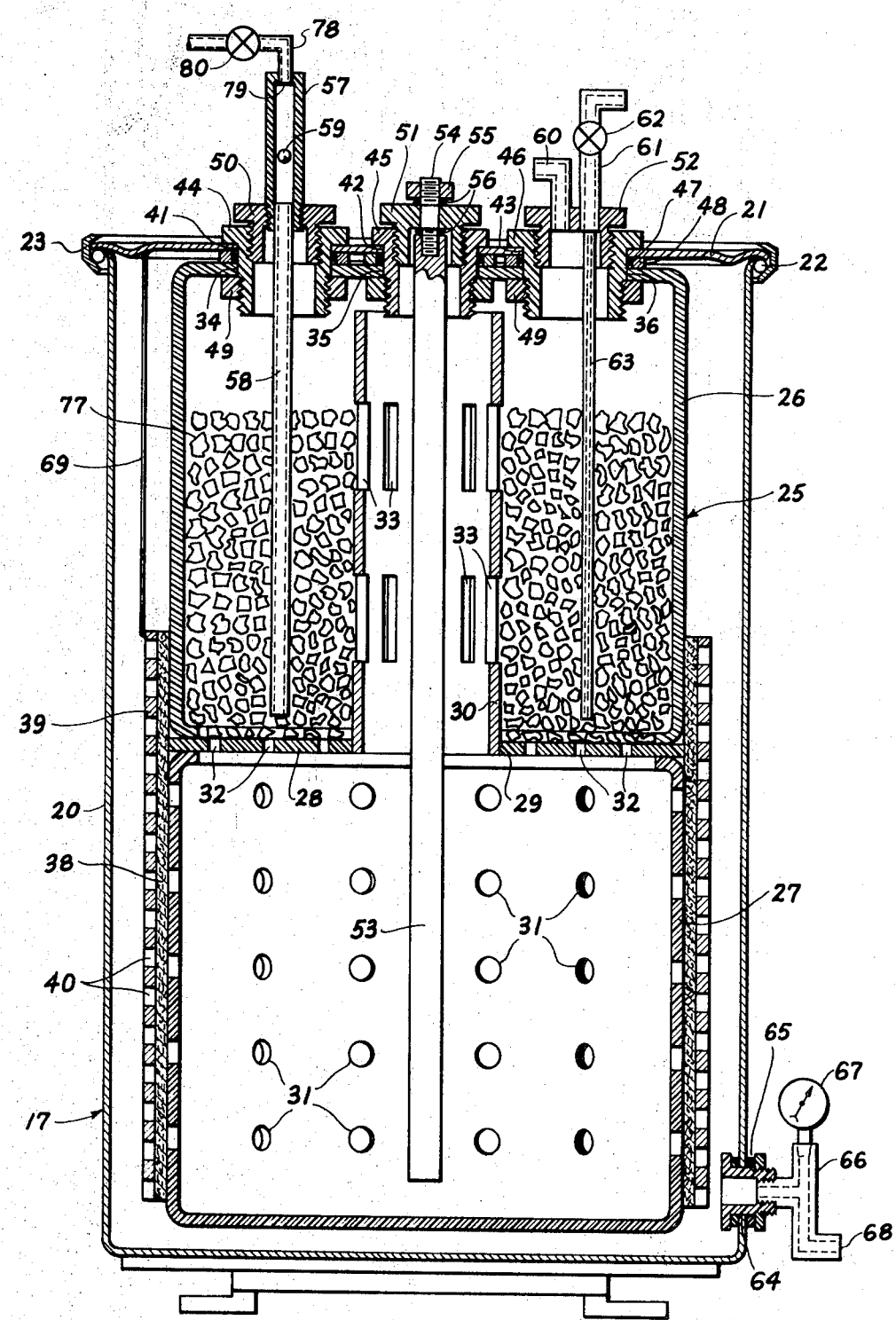
FIG. 2 is a cross-sectional view through a chlorine generator constructed in accordance with a preferred embodiment of the present invention.

Referring to FIG. 2 in detail, the chlorine generator 17 includes an outer container 20 which may be made of steel or of a suitable plastic material which is resistant to sodium hydroxide and brine. A top cover 21, which can be of the same material as the container itself, closes the top of the container and is maintained in sealed relation therewith by means of the O-ring 22 and the circular clamp 23 which compresses the O-ring so as to effect a gas-tight seal.

Within the container 20 there is an inner container 25 consisting of an upper cylindrical member 26 and a lower cylindrical and perforated member 27. A perforated disc 28 joins the bottom of the upper cylinder 26 with the top of the lower cylinder 27. The disc 28 has a centrally located hole 29 in which is received a slotted sleeve 30. The members 26, 27, 28 and 30 are preferably connected together in any convenient manner to form a single unitary member; it should be pointed out further that the upper cylinder 26, the lower cylinder 27, the disc 28 and the sleeve 30 must be made of a material which is resistant to chlorine and saturated chlorine water; polyethylene and polyvinyl chloride have been found to be most satisfactory although methyl methacrylate can be employed.

The lower cylinder 27 is closed at its lower end but is provided with a plurality of holes 31 along its side. The disc 28 is provided with a plurality of small holes 32. The sleeve 30 is provided with a plurality of vertical slots 33. The upper end of the lower cylinder 27 and the lower end of the upper cylinder 26 are open where they join with the disc 28. The upper end of the cylinder 26 is provided with three circular openings 34, 35 and 36, the purposes of which will hereinafter more fully appear.

The bottom portion of the inner container is wrapped with a suitable number of layers of asbestos paper so as to form a porous asbestos diaphragm 38; this porous diaphragm covers all of the perforations 31 in the lower cylinder 27 as well as the joint where the upper and lower cylinders 26 and 27 and the disc 28 come together. The diaphragm 38 is held in place by a cylindrical perforated metal sleeve 39; the metal sleeve 39 is provided with a plurality of small holes or perforations 40. The metal sleeve 39 firmly compresses the diaphragm 38 against the container 25 such that the rate of flow of brine (anolyte) through the diaphragm is very slow; the metal sleeve 39 can also act as a mechanical clamp to hold the cylinders 26 and 27 and the disc 28 together as a unit.

The top 21 is provided with circular openings 41, 42 and 43 which are located in alignment with the holes 34, 35 and 36 of the upper cylindrical member 26. A plurality of hollow plugs 44, 45 and 46 are inserted through the aligned openings as shown. In the space between the top of the cylinder 26 and the bottom of the cover 21, each plug 44, 45 or 46 is provided with an O-ring 47 and a retainer ring 48. On the lower end of each hollow plug 44, 45 or 46 there is threadedly received a squeeze nut 49. Smaller plugs 50, 51 and 52 are threadedly received in the openings in the larger plugs 44, 45 and 46 respectively. It might be mentioned at this point that the plugs, nuts, etc. are preferably made of the same materials that the inner container 25 is made of.

A carbon rod 53, which constitutes the anode of the generator is suspended from the central plug 51 by means of the threaded metallic rod 54 and the nut 55. O-rings 56 located on opposite sides of the plug 51 and around the threaded rod 54 serve to maintain the carbon rod 53 in a gas-tight seal with respect to the exterior of the generator. A hollow and elongated cylindrical cap 57, preferably transparent, is threadedly received at its lower end in a suitable threaded hole in the center of the plug 50. The lower open end of the cap 57 communicates with the lower interior of the cylindrical member 26 by means of the plastic pipe 58 for a purpose which will hereinafter appear. A small plastic ball 59 is located in the interior of the transparent cap 57. The ball 59 is of such a density that it will float in a brine of a specific gravity within a desired range but will sink in a brine having a specific gravity less than that of the desired range.

The plug 52 is provided with two openings in one of which is received the hollow plastic fitting 60 which constitutes the outlet port for the chlorine, as will hereinafter appear; in the other hole of the plug 52 there is received a hollow connection 61 including a valve 62. The lower end of the connection 61 communicates with the lower interior of the cylinder 26 by means of the hollow plastic rod 63. The valve 62 is normally closed but it can be opened to withdraw liquid, if desired, for testing purposes.

The lower end of the outer container 17 is provided with an opening or port 64 in which is received a suitable fitting 65. The fitting 65 connects with another fitting 66. One of the openings in the second fitting 66 is connected with a pressure gauge 67 and the other opening 68 constitutes the outlet port for the removal of the hydrogen generated in the operation of the chlorine generator as well as for the removal of sodium hydroxide which is also formed.

The perforated metal cylinder 39 is connected to the cover 21 by means of a plurality of metal straps 69 (only one of which is shown for convenience in FIG. 2). Thus the metal cylinder 39 is grounded to the cover 21 and the outer container 17. The negative lead is thus connected to the cathode 39 of the generator by simply connecting the the cathode 39 of the generator by simply connecting this lead to the circular clamp 23. The positive lead is connected to the anode 53 by merely attaching this lead to the threaded rod 54.

Turning now to FIG. 3, the power supply includes a variable transformer 70 which is connected to a 115 volt. A.C. source through an on-off switch 71. The output from the variable transformer 70 is applied to a step-down transformer 72. The secondary of the step-down transformer 72 is connected to a full-wave bridge rectifier 73. An ammeter 74 is connected in with one of the leads from the output of the rectifier to measure the current drawn by the generator. The negative lead 75 will be connected to the ring clamp 23 (or to the outer container 17) and the positive lead 76 will be connected to the threaded rod 54.

Returning again to FIG. 2, the transparent cap 57 and the ball 59 therein constitute a hydrometer which can be used for testing the specific gravity of the brine; in order to replace the brine within the cap 57 with a fresh sample of brine from the interior of the container 25, the upper end of the cap 57 connects with a plastic fitting 78 through the opening 79. The plastic fitting, in turn, connects with a valve 80. If during the operation of the chlorine generator it is desired to replace the brine within the plastic cap 57, the valve 80 is merely opened and sufficient brine is bled through the fitting 78 until the column of brine in the plastic tube 58 and the cap 57 are replaced. Thereafter the valve 80 is closed and the position of the plastic ball 59 is observed. If the plastic ball 59 is at the top of the cap 57, then it will be recognized that the brine is in the desired density range; if the ball 59 is below the top of the cap 57, or resting on the bottom thereof, then it will be recognized that the brine is below the desired specific gravity. The hole 79 will actually be a narrow slit of greater longitudinal dimension than the diameter of the ball 59 so as to prevent any possible check valve effect when liquid is bled from the cap 57.

Although the diaphragm 38 has been described as being made of asbestos or the like, other materials and methods of making the diaphragm can be employed such as, for example, in the teachings of Patent No. 3,057,794. Although the anode 53 is described as being made of carbon preferably any other suitable anode material can be employed, such as the anode material described in Patent No. 3,055,811.

Operation of the chlorine generator

Figure 1:
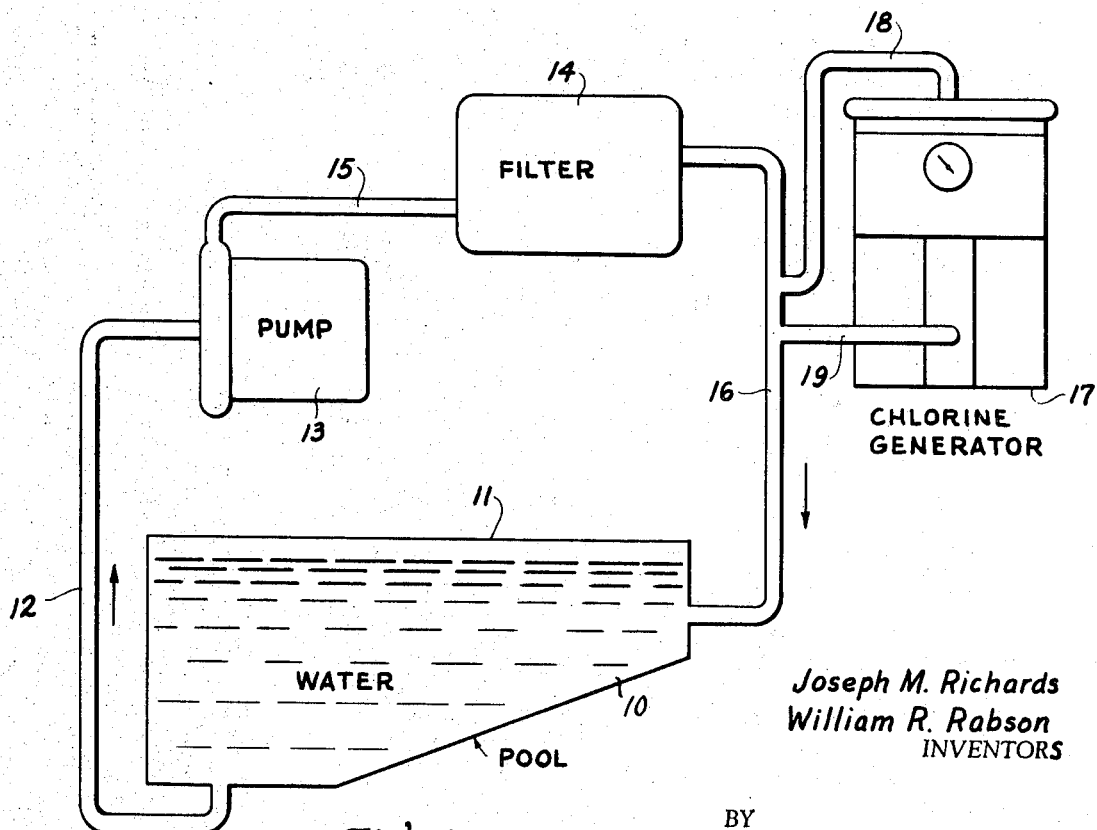
FIG. 1 is a semi-diagrammatic view showing the fluid circuit including the pool, the circulating pump, the filter and the chlorine generator of the present invention.

The plug 52 is removed and the upper cylindrical member 26 is nearly filled with sodium chloride in the form of rock salt 77 through the opening in the plug 46. The inner container 25 is now filled with water nearly to the top and covering the rock salt 77. The plug 52 is screwed back into place. The free end of the conduit 18 is connected with the outlet port 60 for the chlorine. This conduit 18 is preferably of polyethylene, polyvinyl chloride, or "Tygon" or some other plastic material resistant to chlorine. The free end of the conduit 19 is connected to the outlet port 68 for the hydrogen. The conduit 19 should be made of plastic, rubber or metal material which is resistant to sodium hydroxide. Now the chlorine generator 17 is connected in the manner shown in FIG. 1.

The power supply of FIG. 3 is now connected to the chlorine generator in the manner described above and the switch 71 is closed. By means of adjusting the variable transformer 70, the current can be adjusted to some predetermined value, say ten to fifteen amperes, and the electrolysis proceeds. The current will increase until the diaphragm is saturated with brine; thereafter the current can be readjusted to that value which will provide the required amount of chlorine to properly chlorinate the pool. As the electrolysis proceeds, the pressure of the chlorine and the hydrogen in the generator builds up to the point that it slightly exceeds the pressure in the return flow line 16 and enters the water stream in the return flow line in the form of small bubbles. The pressure gauge 67 will, therefore, measure the return flow pressure which is essentially equal to the pressures in the inner container and the annular space between the inner and outer containers. The chlorine is readily dissolved in the water and is not discernible as bubbles or by odor at the pool inlet. The hydrogen, however, being relatively insoluble in water escapes into the atmosphere at the pool inlet. Further, as the operation continues, sodium hydroxide which is formed on the outside of the cylinder 39 will drip to the bottom of the outer container 17 and collect there along with a very small amount of brine.

After about twenty-four hours of operation (the time may be adjusted to be longer or shorter), the pool circulating pump and the power supply are shut off for about one minute. The pressure in the generator then falls to the pressure in the return flow line (i.e. zero or possibly a negative value). The pump is then started again and water is forced into the container 25 to replace that which had been lost due to electrolysis and into the annular space between the containers 17 and 25. The sodium hydroxide contained in the bottom of the outer container mixes with the pool water and, as the pressure again builds up in the generator, the sodium hydroxide solution is gradually forced into the return through the conduit 19 thus neutralizing the acidity of the pool water which has occurred due to the formation of hypochlorous and hydrochloric acids by the solution of the chlorine gas in the water.

With continued operation, the salt 77 in the inner container 25 will gradually be depleted due to electrolysis and some seepage through the diaphragm 38. This depletion may be observed as a reduction in the specific gravity of the brine. In order to monitor the specific gravity of the brine an automatic hydrometer is provided; this hydrometer consists of the transparent cap 57, the plastic tube 58 and the plastic ball 59. The operation of this hydrometer has been described above in connection with the opening and closing of the valve 80. Thus, the specific gravity of the brine can be checked as often as desired, for example on a daily basis.

When it becomes necessary to add salt to the generator, the circulating pump is first shut off and the current to the generator is also turned off, thus permitting the pressure in the generator to fall to its minimum value. The plug 52 is loosened, the valve 62 is opened and a piece of plastic tubing (not shown) is atttached to the upper end of the fitting 61 for the purpose of siphoning solution from the inner container 25; it is only necessary to remove that quantity of liquid which would be sufficient to provide adequate space for the addition of a fresh charge of salt. Thereafter, water is added to the inner container 25 as explained previously and the cycle of operation is repeated in the manner set forth above.

From the foregoing description it should be noted that we have a separate sampling and/or siphoning tube comprising the fitting 61, valve 62 and tube 63; and a separate hydrometer comprising the cap 57, the tube 58, the ball 59, the conduit 78 and the valve 80. If desired, the hydrometer and its associated connections could be used as the siphoning and/or sampling tube in which case elements 61, 62 and 63 could be eliminated and replaced by elements 57, 58, 59, 78 and 80. If the sampling and/or siphoning tube shown in FIG. 2 were then replaced by the hydrometer which would function as a sampling and/or siphoning tube, then the plug 50 could be made solid across the top and this could serve as the opening for the introduction of salt and make up water thereby obviating the necessity for removing the plug 52.

Whereas the present invention preferably employs sodium chloride as the metallic chloride, it is possible that other chlorides such as potassium chloride could be employed. However, sodium chloride is cheaper and more readily available. In the event that other chlorides are employed care must be taken to see that the diaphragm 38 does not become clogged by the metallic hydroxide produced. Also in the case of some of these other chlorides it may be necessary after flushing the metallic hydroxide from the annular space between the inner and outer containers to discharge the flushed water containing this metallic hydroxide to the drain rather than to discharge it into the pool. In the case of the use of sodium chloride, with the consequent production of sodium hydroxide, the water which contains the sodium hydroxide after flushing can also be sent to the drain if, for any reason, it is desired not to introduce the sodium hydroxide to the pool water.

Whereas the present invention has been described in particular relation to the drawings attached hereto, it should be understood that other and further modifications, apart from those shown or suggested herein, may be made within the spirit and scope of this invention.

What is claimed is:

1. An electrolytic cell for generating gaseous chlorine comprising a closed cathode chamber; a closed anode chamber for containing therein a concentrated aqueous solution of a metallic chloride; said anode chamber including an upper member, a lower member and a perforated disc joining the bottom of said upper member with the top of said lower member, said disc having a centrally located hole therein; a slotted sleeve mounted in said upper member and having its lower end received in said hole in said disc; means for introducing rock salt into said upper member; a cathode mounted in said cathode chamber and being in communication with said anode chamber through a porous diaphragm; an anode in the form of an elongated rod centrally mounted in said anode chamber extending downwardly through said slotted sleeve and into said lower member; means for supplying a D.C. voltage across said anode and said cathode so as to produce gaseous chlorine in said anode chamber; a conduit connecting from the upper end of said anode chamber for discharging gaseous chlorine from said cell; and a conduit connected to said cathode chamber for discharging gaseous hydrogen from said cell.

2. An electrolytic cell for generating gaseous chlorine comprising an outer closed cylindrical container made of a material resistant to caustic, an inner cylindrical container mounted within said outer container and being made of a material resistant to gaseous chlorine and brine, the upper outer end of said inner container being connected to the inner upper end of said outer container in a pressure-tight relation, said inner cylindrical container being composed of an upper cylindrical member and a lower cylindrical member, a flat horizontal perforated disc interposed between said two cylindrical members, the bottom of said upper cylindrical member being open and the upper end of said lower cylindrical member being open whereby said upper and lower cylindrical members are in communication with each other through the perforations of said perforated disc, the bottom of said lower cylindrical member being closed, the cylindrical side of said lower cylindrical member being provided with a plurality of holes extending peripherally around said lower cylindrical member and from the top to the bottom thereof, said disc having a large circular hole through the center thereof, an elongated slotted sleeve open at both ends and having its lower end received in said central circular hole in said disc and extending vertically upward with its upper end terminating adjacent the upper end of said upper cylindrical member, said inner cylindrical container constituting an anode chamber, an elongated carbon rod extending from the top of said upper cylindrical member through said slotted sleeve and terminating adjacent the lower end of said lower cylindrical member and constituting an anode, electrical connecting means connected with the upper end of said carbon rod and extending outwardly beyond said containers in pressure-tight relation therewith, a porous asbestos diaphragm encircling the lower end of said inner cylindrical container and covering all of the holes in said lower cylindrical member as well as the joint between said cylindrical members and said disc, a cylindrical perforated metal sleeve surrounding said porous diaphragm and compressing said diaphragm against said inner cylindrical container, the annular space between said inner and outer containers constituting a closed cathode chamber, said cylindrical perforated metal sleeve constituting a cathode, electrically conductive means connected from said cylindrical perforated metallic sleeve to the upper end of said outer cylindrical container and providing an electrically conductive path exterior of said outer cylindrical container to said cylindrical perforated metal sleeve, a first port communicating through said containers with the interior of said anode chamber, a first conduit connecting with said first port for discharging gaseous chlorine from said cell, a second port communicating with said cathode chamber, and a second conduit connecting with said second port for discharging gaseous hydrogen from said cell.

3. An electrolytic cell as set forth in claim 2 including a hydrometer means for continuously monitoring the specific gravity of the brine solution within said inner container, said hydrometer including an external and transparent hollow cap, a tube extending from the lower end of said transparent cap inward to the interior of said anode chamber, an exterior bleed line connected with the upper end of said transparent cap, a valve in said external bleed line and a plastic ball mounted within said transparent cap and having a specific gravity less than the desired specific gravity of the brine contained within said inner container, whereby when the specific gravity of the brine in said transparent cap is within the desired range, said plastic ball will be adjacent the top of said transparent cap and whereby when the specific gravity of said brine in said transparent cap falls below the desired specific gravity, said ball will be below the upper end of said transparent cap.

References Cited

UNITED STATES PATENTS

| | | | |
|---|---|---|---|
| 522,616 | 7/1894 | Roberts | 204—98 |
| 723,398 | 3/1903 | Le Sueur | 204—98 |
| 978,934 | 12/1910 | Pietzch et al. | 204—98 |
| 982,704 | 1/1911 | Bull | 210—47 |

JOHN H. MACK, Primary Examiner

A. C. PRESCOTT, Assistant Examiner

U.S. Cl. X.R.

204—149, 275